Figure 1:
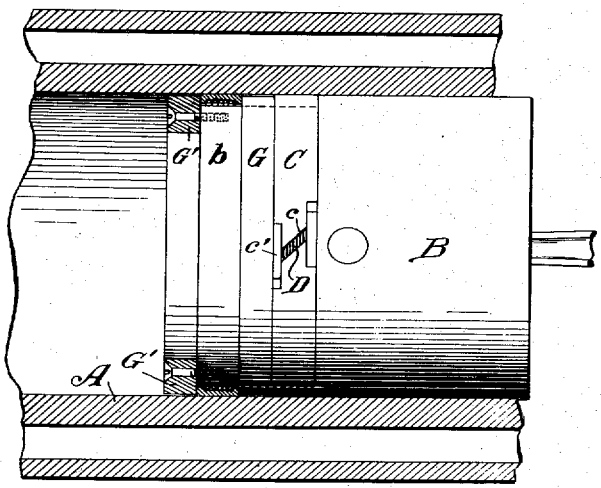

C. R. MAPLES.
PACKING RING.
APPLICATION FILED AUG. 8, 1908.

939,047.

Patented Nov. 2, 1909.

Witnesses:
Brennan B. West.
Nathan F. Fretter.

Inventor.
Charles R. Maples,
By Baker, Fouts & Hill,
Attys.

UNITED STATES PATENT OFFICE.

CHARLES R. MAPLES, OF CLEVELAND, OHIO.

PACKING-RING.

939,047.  Specification of Letters Patent.  Patented Nov. 2, 1909.

Application filed August 3, 1908. Serial No. 447,522.

*To all whom it may concern:*

Be it known that I, CHARLES R. MAPLES, a citizen of the United States, residing at Cleveland, in the county of Cuyahoga and State of Ohio, have invented a certain new and useful Improvement in Packing-Rings, of which the following is a full, clear, and exact description, reference being had to the accompanying drawings.

The object of this invention is to provide a very efficient and at the same time a cheap packing ring for pistons of engines, pumps, and the like.

My packing ring is adapted to maintain at all times a snug connection between the piston and cylinder wall without giving undue pressure on the wall and to automatically adjust itself, as the wall wears, to maintain a tight connection.

The invention comprises the means I employ to this end, which consist broadly of a split ring and a coiled spring wire extending around the inner periphery of the ring and holding it in the desired expanded condition and causing it to gradually further expand as the cylinder walls allow it.

I further provide suitable flanges for holding the wire in place, which flanges may be formed integrally on the inner side of the ring by means of a recess turned in the ring, or may be made by a thin piece of sheet metal bearing against the inner surface of the ring.

The invention is hereinafter more fully described in connection with the drawing and the essential characteristics are set out in the claims.

Figure 2:
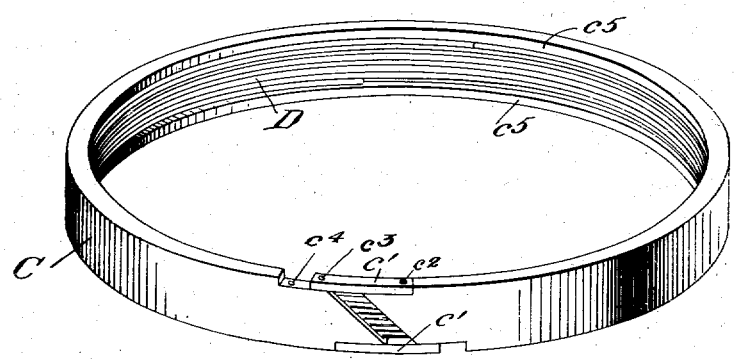
Figure 4:
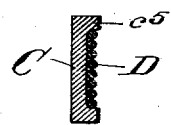
Figure 3:
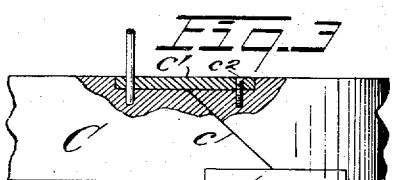
Figure 5:
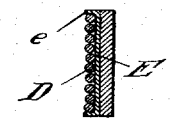

In the drawing, Figure 1 is a side elevation of a piston equipped with two of my packing rings, one of the rings and portions of the cylinder wall being shown in section; Fig. 2 is a perspective of my packing ring; Fig. 3 is a detail of the packing ring adjacent to the split; Fig. 4 is a cross section of the ring; Fig. 5 is a cross section of the modified form where the flanges are carried by a separate piece of metal.

Referring by reference letters to the drawing, A represents the cylinder wall; B a usual trunk piston. On this piston are annular recesses $b$ for the reception of the packing rings. These parts, of course, are of any construction, my packing rings being adapted to occupy the ordinary annular space between a shoulder and follower on the piston.

My packing ring comprises the ring proper C and the coiled wire D. The ring is shown as split at $c$. The wire occupies the groove behind the ring and makes several turns about the piston and bears outwardly against the ring. The wire is of spring material and its resilience tends to uncoil it and thereby expand the ring. This uncoiling force, however, is not very great, being just sufficient to keep the ring expanded and to further expand it when the cylinder wall allows. When once expanded, however, the pressure on the outside does not contract it, as that could only be accomplished by the wire creeping within the ring in the direction to wind up the coil, which the resilience of the wire prevents. The result is that the coiled wire keeps the ring constantly bearing against the cylinder wall with just the right amount of pressure, gradually expanding the ring as the wall and ring wear. So perfect is this fit that I have found it possible to operate the pistons without lubrication and without leakage.

In installing my packing rings, the wire D is coiled and placed within the ring before it is expanded, the ring being suitably held in contracted position and the wire simply coiled around inside of it. To hold the ring in such position I may provide adjacent to the split $c$ one or more tongues $c'$ carried by one portion of the ring and extending across the adjacent portion. These tongues are shown as held to the respective portions of the ring by screws $c^2$. When the ring is compressed, an opening $c^3$ in the tongue comes opposite an opening $c^4$ in the ring, so that a suitable pin inserted through such alined openings will hold the ring compressed. In this position the wire is coiled within the ring. The ring is then put in place on the piston and the withdrawal of the pin allows the ring to expand under the influence of the wire. After the ring or rings, with or without separators G, are installed, the follower G′ is put on as usual, holding the rings against longitudinal displacement.

To keep each coil of wire D within its corresponding ring, I provide edge flanges preventing the lateral escape of the wier. These flanges may be a portion of the ring itself, as shown at $c^5$ in Fig. 4, where the flanges are provided by simply making a wide groove $c^6$ in the inner periphery of the ring in which groove the wire lies. Where it is desired to use an existing ring without grooving it, I provide the flanges by means of a separate piece of sheet metal located between the wire and the inner periphery of the ring. This piece of sheet metal is shown at E in Fig. 5. It is thin and split corresponding to the ring and forms simply a liner therefor and is provided with edge flanges $e$, the wire D lying in the recess provided between these flanges.

It will be seen that my ring is extremely simple in construction, that it is self-contained, itself carrying its expanding means; that there is nothing about it to get out of order, and that it automatically adapts itself to the conditions of wear, as required. Inasmuch as the ring expands whenever the cylinder allows it, and cannot contract, it automatically wears down any high places in the wall, keeping the cylinder true.

I claim:

1. The combination of a split ring, means for temporarily holding it compressed, a spring wire adapted to be coiled within the ring when compressed and to expand the ring when the temporary holding means is released, and lateral retaining means for the wire.

2. In a packing device, a ring having a split end provided with a tongue on one portion extending across the split to the other portion, said tongue and other portion having openings adapted to aline when the ring is compressed, whereby it may be held compressed by a pin combined with a wire coiled around the inner periphery of the ring, and means for preventing the lateral escape of the wire.

3. As a new article of manufacture, a self-contained expansible packing rig comprising a split ring having a cylindrical exterior, and interior, a wire coiled into a helix within the ring, said wire being comparatively long and of small cross-section and tending to substantially uncoil, and means for preventing the lateral escape of the wire from the interior of the ring.

In testimony whereof, I hereunto affix my signature in the presence of two witnesses.

CHARLES R. MAPLES.

Witnesses:
ALBERT H. BATES,
BRENNAN B. WEST.

---

Correction in Letters Patent No. 939,047.

It is hereby certified that in Letters Patent No. 939,047, granted November 2, 1909, upon the application of Charles R. Maples, of Cleveland, Ohio, for an improvement in "Packing-Rings," an error appears in the printed specification requiring correction as follows: Page 2, line 44, the word "rig" should read *ring;* and that the said Letters Patent should be read with this correction therein that the same may conform to the record of the case in the Patent Office.

Signed and sealed this 3d day of May, A. D., 1910.

[SEAL.]

C. C. BILLINGS,
*Acting Commissioner of Patents.* itself, as shown at $c^5$ in Fig. 4, where the flanges are provided by simply making a wide groove $c^6$ in the inner periphery of the ring in which groove the wire lies. Where it is desired to use an existing ring without grooving it, I provide the flanges by means of a separate piece of sheet metal located between the wire and the inner periphery of the ring. This piece of sheet metal is shown at E in Fig. 5. It is thin and split corresponding to the ring and forms simply a liner therefor and is provided with edge flanges $e$, the wire D lying in the recess provided between these flanges.

It will be seen that my ring is extremely simple in construction, that it is self-contained, itself carrying its expanding means; that there is nothing about it to get out of order, and that it automatically adapts itself to the conditions of wear, as required. Inasmuch as the ring expands whenever the cylinder allows it, and cannot contract, it automatically wears down any high places in the wall, keeping the cylinder true.

I claim:

1. The combination of a split ring, means for temporarily holding it compressed, a spring wire adapted to be coiled within the ring when compressed and to expand the ring when the temporary holding means is released, and lateral retaining means for the wire.

2. In a packing device, a ring having a split end provided with a tongue on one portion extending across the split to the other portion, said tongue and other portion having openings adapted to aline when the ring is compressed, whereby it may be held compressed by a pin combined with a wire coiled around the inner periphery of the ring, and means for preventing the lateral escape of the wire.

3. As a new article of manufacture, a self-contained expansible packing rig comprising a split ring having a cylindrical exterior, and interior, a wire coiled into a helix within the ring, said wire being comparatively long and of small cross-section and tending to substantially uncoil, and means for preventing the lateral escape of the wire from the interior of the ring.

In testimony whereof, I hereunto affix my signature in the presence of two witnesses.

CHARLES R. MAPLES.

Witnesses:
ALBERT H. BATES,
BRENNAN B. WEST.

---

Correction in Letters Patent No. 939,047.

It is hereby certified that in Letters Patent No. 939,047, granted November 2, 1909, upon the application of Charles R. Maples, of Cleveland, Ohio, for an improvement in "Packing-Rings," an error appears in the printed specification requiring correction as follows: Page 2, line 44, the word "rig" should read *ring;* and that the said Letters Patent should be read with this correction therein that the same may conform to the record of the case in the Patent Office.

Signed and sealed this 3d day of May, A. D., 1910.

[SEAL.]

C. C. BILLINGS,
*Acting Commissioner of Patents.*

Correction in Letters Patent No. 939,047.

It is hereby certified that in Letters Patent No. 939,047, granted November 2, 1909, upon the application of Charles R. Maples, of Cleveland, Ohio, for an improvement in "Packing-Rings," an error appears in the printed specification requiring correction as follows: Page 2, line 44, the word "rig" should read *ring;* and that the said Letters Patent should be read with this correction therein that the same may conform to the record of the case in the Patent Office.

Signed and sealed this 3d day of May, A. D., 1910.

[SEAL.]

C. C. BILLINGS,
*Acting Commissioner of Patents.*